United States Patent
Yonemoto et al.

(10) Patent No.: US 11,978,887 B2
(45) Date of Patent: May 7, 2024

(54) METHOD OF PREPARING LITHIUM-ION CATHODE PARTICLES AND CATHODE ACTIVE MATERIAL FORMED THEREFROM

(71) Applicant: Microvast Power Systems Co., LTD., Huzhou (CN)

(72) Inventors: Bryan T. Yonemoto, Orlando, FL (US); Huijie Guo, Huzhou (CN); Xiao Zhang, Huzhou (CN); Zhifeng Zhang, Huzhou (CN); Xuelei Sun, Huzhou (CN); Tianshu Deng, Huzhou (CN)

(73) Assignee: MICROVAST ADVANCED MATERIALS INC., Lake Mary, FL (US)

( * ) Notice: Subject to any disclaimer, the term of this patent is extended or adjusted under 35 U.S.C. 154(b) by 694 days.

(21) Appl. No.: 16/643,561

(22) PCT Filed: Aug. 30, 2018

(86) PCT No.: PCT/CN2018/103259
§ 371 (c)(1),
(2) Date: Feb. 29, 2020

(87) PCT Pub. No.: WO2019/042359
PCT Pub. Date: Mar. 7, 2019

(65) Prior Publication Data
US 2020/0203718 A1 Jun. 25, 2020

Related U.S. Application Data

(60) Provisional application No. 62/552,381, filed on Aug. 30, 2017.

(51) Int. Cl.
*H01M 4/36* (2006.01)
*C01G 53/00* (2006.01)
(Continued)

(52) U.S. Cl.
CPC .......... *H01M 4/364* (2013.01); *C01G 53/006* (2013.01); *C01G 53/44* (2013.01); *H01M 4/505* (2013.01);
(Continued)

(58) Field of Classification Search
CPC .................................................... C01G 53/44
See application file for complete search history.

(56) References Cited

U.S. PATENT DOCUMENTS 7,965,649 B2 6/2011 Tee et al.
8,591,774 B2 11/2013 Koenig, Jr. et al.
(Continued)

FOREIGN PATENT DOCUMENTS

CN 102368548 A 3/2012
CN 103904318 A 7/2014
(Continued)

*Primary Examiner* — Peter F Godenschwager
(74) *Attorney, Agent, or Firm* — Cheng-Ju Chiang (57) ABSTRACT

A method of preparing cathode particles using a co-precipitation reaction in a reactor is disclosed. A feed stream (a) containing metal cations is fed into the reactor, and a feed stream (b) containing anions is fed into the reactor, wherein a ratio of the metal cations in the feed stream (a) is continuously changed from $A_1$ at time $t_1$ to $A_2$ at time $t_2$. The feed stream (a) and the feed stream (b) are contacted in the reactor to form precipitated precursor particles, and at least one transition metal component in the particle has a non-linear continuous concentration gradient profile over at least a portion along a thickness direction of the particle.

19 Claims, 9 Drawing Sheets

(51) Int. Cl.
*H01M 4/02* (2006.01)
*H01M 4/505* (2010.01)
*H01M 4/525* (2010.01)
*H01M 10/0525* (2010.01)

(52) U.S. Cl.
CPC ....... *H01M 4/525* (2013.01); *H01M 10/0525* (2013.01); *C01P 2002/85* (2013.01); *C01P 2004/03* (2013.01); *C01P 2004/61* (2013.01); *C01P 2006/11* (2013.01); *C01P 2006/12* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 8,865,348 B2 | 10/2014 | Sun et al. |
| 8,926,860 B2 | 1/2015 | Sun et al. |
| 9,011,669 B2 | 4/2015 | James |
| 9,847,525 B2 * | 12/2017 | Zhang et al. |
| 2010/0209771 A1 * | 8/2010 | Shizuka ................ C01G 53/44 429/231.95 |
| 2014/0131616 A1 | 5/2014 | Sun et al. |
| 2016/0049645 A1 | 2/2016 | Zheng et al. |
| 2016/0049647 A1 | 2/2016 | Park et al. |

FOREIGN PATENT DOCUMENTS

| | | |
|---|---|---|
| CN | 104201369 A | 12/2014 |
| CN | 105359314 A | 2/2016 |
| EP | 2993719 A1 | 3/2016 |

* cited by examiner

METHOD OF PREPARING LITHIUM-ION CATHODE PARTICLES AND CATHODE ACTIVE MATERIAL FORMED THEREFROM

CROSS-REFERENCE TO RELATED APPLICATION

This invention is based on and claims the priority of U.S. provisional application No. 62/552,381, filed on Aug. 30, 2017. The entire disclosure of the above-identified application is incorporated herein by reference.

TECHNICAL FIELD

This invention relates to a method to prepare a non-aqueous lithium-ion battery cathode particles, and a cathode active material formed from the cathode particles.

BACKGROUND ART

The lithium-ion battery, originally commercialized in the early 1990s, has come to dominate the energy storage market for hand-held, electronic consumer devices. This is because the battery is rechargeable, and has high mass and volume energy density. Now, lithium-ion batteries are also being extensively investigated for electric vehicle applications. In electric vehicles, an ideal battery cathode will have high capacity, high power, improved safety, long cycle life, low toxicity and lower production costs. Generally, cathode materials are unable to meet all these requirements.

One reason that cathode materials, commonly of the form LiMO2, are unable to meet all the demands for electric vehicles is because changing the composition of the common layer elements—Ni, Mn & Co—results in trade-offs in performance. One way to address the trade-offs from altered composition is through gradient cathode materials.

To achieve high energy densities using Ni, Mn and Co based lithium cathode active materials, the capacity of the material must increase. One known way to increase the capacity of the material is to increase the average Ni content of the NMC composition. While higher Ni raises the initial capacity, it significantly worsens the cathode materials capacity retention during secondary cell cycling, and results in a high energy interface that easily reacts with the electrolyte or decomposes to a new crystallographic structure. To address the surface instability, concentration gradient cathodes such as U.S. Pat. No. 7,965,649B2, U.S. Pat. No. 8,865,348B2, U.S. Pat. No. 8,591,774B2 and U.S. Pat. No. 8,926,860B2 have been disclosed. By protecting a higher energy core NMC (or NCA) composition with a more stable NMC (or NCA) composition, the cycle life can be greatly improved. Still, even higher energy densities are desired, which means materials with a higher Ni content, without sacrificing the interfacial stability provided by the concentration gradient is desired.

In U.S. Pat. No. 7,965,649B2, the concentration gradient described is prepared by making a core-shell particle. The problem with these types of concentration gradients is the large step change in NMC compositions necessary to go in order to form a high energy material to a more stable surface composition, which may result in delamination of the shell, negating the intended benefits of the gradient. In addition, the Ni—Mn—Co ranges described for the core does not exceed 65% Ni, and it is impossible to increase the average Ni concentration in the material without changing the surface composition or altering percentage of the particle that is composed of the shell composition.

In U.S. Pat. No. 8,591,774B2, a process to make particles with the whole particle, or a portion of the particle, with a transition metal gradient between two NMC compositions is described via stirring a first transition metal solution into a second transition metal solution tank. The described procedure has a collected product whose surface changes with time while the gradient is active, which is undesirable.

In U.S. Pat. No. 8,865,348B2, Sun et al. demonstrate a core NMC particle coated with a continuous concentration gradient from the core and surface NMC composition. In U.S. Pat. No. 8,926,860B2, materials with a concentration gradient over the entire particle are described. In both disclosures, the continuous concentration gradients described have a linear slope between the start and end compositions of the co-precipitated precursor particle. This means the Ni content over that region of the particle is the mean of the average of the core and surface composition.

In CN104201369B, the first transition metal solution and the second transition metal solution have identical volumes and the volumetric flowrates between the two solutions is 1:2, with the latter flow being added to the reactor for coprecipitation. This results in linear gradients where the nominal NMC ratio is the average of the two solutions.

In CN102368548, two distinct compositions are fed in separate feeds lines into a reaction vessel and the flows are varied to produce a core, gradient, shell structure. Without mixing the two compositions before feeding to the reactor, the primary particles will show atomic level NMC segregation that is skewed towards one of the two compositions. This means a high Ni primary particle could still be present at the material surface despite the average composition at the surface changing. In addition, the feed tubes will potentially clog when no flow is present.

Technical Solution

The object of the proposed method is to prepare concentration gradient cathode particles which can then be used as a cathode active material in a lithium-ion battery. The method is distinguished from prior arts by:

a method to produce cathode particles where at least one transition metal component has a non-linear continuous concentration gradient profile over at least a portion of the particle, a method to raise the nominal mole percent of Ni, Mn or Co of a concentration gradient active material without changing the concentration gradients relative thickness or initial and final transition metal composition compared to a similarly prepared material, but with linear concentration gradients, a process to contact the starting and ending transition metal composition of a continuous concentration gradient particle that does not require mechanical agitation, a process to contact the material that does not require the outer composition to be fed into the internal composition feed tank, a process where the concentration gradient feed composition to the co-precipitation reactor is independent of the total solution volume present at the start, or during the concentration gradient reaction.

According to an embodiment of the invention, a method of preparing cathode particles using a co-precipitation reaction in a reactor is provided. The method includes:

feeding a feed stream (a) containing metal cations into the reactor;

feeding a feed stream (b) containing anions into the reactor;

wherein a ratio of the metal cations in the feed stream (a) is continuously changed from $A_1$ at time $t_1$ to $A_2$ at time $t_2$;

wherein the feed stream (a) and the feed stream (b) are contacted in the reactor to form precipitated precursor particles, and at least one transition metal component in the particle has a non-linear continuous concentration gradient profile over at least a portion along a thickness direction of the particle.

According to an embodiment of the invention, a cathode active material is provided. The cathode active material includes cathode particles, at least one transition metal component in the particle having a non-linear continuous concentration gradient profile over at least a portion along a thickness direction of the particle.

Further, a lithium-ion battery having a cathode electrode made from the above cathode active material is also provided.

MODE FOR INVENTION

For all embodiments in the present invention, concentration gradient particles will be prepared using a co-precipitation reaction in a precipitation reactor.

A precipitation reactor is blanketed or bubbled by He, N2 or Ar gas and includes a feed stream (a) for feeding metal cations into the reactor for precipitation, a feed stream (b) for feeding anions into the reactor for precipitation, an outflow stream (c) of the slurry of precipitated precursor particles, and an optional feed stream (d) for feeding chelating agents. Additional feed streams (e, f, z) may be present to add additional species to the precipitation reactor or to remove solvent through an in-situ thickening device.

The volume of a precipitation reactor is defined as the volume of a single processing vessel or the sum of a number of processing vessels, pumps, or solid-liquid thickening devices connected in parallel.

The precipitation reactor can generally be described by the following mass balance equation:

$$\frac{d(\rho_c V)}{dt} = \sum_{\alpha=a}^{z} F_\alpha \rho_\alpha$$

where the inlet/outlet streams $\alpha=a$ to $z$, $\rho\alpha$ is the fluid density, V is the volume of the precipitation reactor, $F_\alpha$ is the volumetric flowrate. $\rho_c$ is density of accumulating fluid in the reactor (and changes with time).

It is well established in co-precipitation concentration gradient materials that the particle size is proportional to the reaction time, and that the composition deposited onto a particle at a particular time is directly related to the inlet ion compositions.

In the inventive process, a ratio of the metal cations in the feed stream (a) is continuously changed from $A_1$ at time $t_1$ to $A_2$ at time $t_2$. That is, the feed stream (a) has a first metal cation ratio, $A_1$, that is continuously changed from time $t_1$ to time $t_2$ until a second metal cation ratio, $A_2$ is reached. This feed behavior of the feed stream (a) during the precipitation reaction can be described by the derivative:

$$\frac{d(C_{a,i})}{dt} \neq 0 \text{ from } t_1 \text{ to } t_2$$

where $C_{a,i}$ is the concentration of metal ion i in the feed stream (a) between the start and the end of the reaction. If $t_0$ and $t_f$ are defined respectively as the start time and the end time of the co-precipitation reaction, the concentration gradient duration during the precipitation reaction can occur when $t_0=t_1<t_2=t_f$, $t_0<t_1<t_2<h$, $t_0<t_1<t_2=h$, or $t_0=t_1<t_2<t_f$.

In a preferred embodiment, $t_0=t_1<t_2=t_f$.
In a preferred embodiment, $t_0=t_1<t_2<t_f$.
In a preferred embodiment, $t_0<t_1<t_2=t_f$.
In a preferred embodiment, the first derivative in concentration is continuous from to $t_0$ $t_f$.

Additionally, during this transition of the metal cation ratio from $A_1$ to $A_2$, the change in the slope for the continuous concentration gradient is described in the inventive process by:

$$\frac{d^2(C_{a,i})}{dt^2} \neq 0 \text{ from } t_1 \text{ to } t_2$$

The expression means the change of concentration of at least one of the metal cations in the feed stream (a) is not linear with respect to the reaction time over the period from $t_1$ to $t_2$.

Particularly, a ratio of the metal cations in the feed stream (a) is fixed at $A_1$ over the period from $t_0$ to $t_1$, and a ratio of the metal cations in the feed stream (a) is fixed at $A_2$ over the period from $t_2$ to $t_f$, wherein $t_0 \leq t_1$, and $t_2 \leq t_f$. That is, during the period from $t_0$ to $t_1$, the metal cation ratio in the feed stream (a) is maintained constant at $A_1$, and during the period from $t_2$ to $t_f$, the metal cation ratio in the feed stream (a) is maintained constant at $A_2$.

The precipitation reactor is well mixed and has a Re (Reynold number)>6,400, with a blend time of 0-1,200 seconds, preferably 0-120 seconds, more preferably 0-45 seconds.

The temperature of the precipitation reactor is maintained between 30-80° C., but more preferably from 45-60° C.

The pH of the precipitation reactor is maintained from 7-13, but preferably from 10.5-12 when precipitating hydroxides and 8.5-10 when precipitating carbonates.

The feed stream (a) contains the metal cations for precipitation with a concentration from 0.001-6 (mol cation/L). The metal cations are selected from transition metals of Mg, Ca, Ti, V, Cr, Mn, Fe, Co, Ni, Cu, Al, or any combination thereof. The metal cation resource is selected from sulfate, carbonate, chloride, nitrate, fluoride, oxide, hydroxide, oxyhydroxide, oxalate, carboxylate, acetate, phosphate, borate, or any combination thereof.

The ratios $A_1$ and $A_2$ of the metal cations in the feed stream (a) is described as $Ni_xMn_yCo_zMe_{1-x-y-z}$, where x+y+z≥0.9, z≤0.4, and Me may be one or more additional elements. Under these feed conditions, a precipitated precursor particle of the form $(Ni_xMn_yCo_zMe_{1-x-y-z})(CO_3)_a(OH)_{2-2a}$ will be collected after time $t_f$.

In a preferred embodiment, the ratio $A_1$ is selected from 0.85≤x≤1; 0≤z≤0.1.

In a preferred embodiment, the ratio $A_2$ is selected from 0.4≤x≤0.7; 0.25≤y≤0.5.

In a preferred embodiment, the nominal fraction of x in the final material will be greater than the linear average of $x_{A1}$ and $z_{A2}$, wherein $x_{A1}$ represents the nominal fraction of x when the ratio is $A_1$ and $x_{A2}$ represents the nominal fraction of x when the ratio is $A_2$. In addition, the nominal fraction of x in the prepared particle and final active material will be from 0.6≤x≤0.95. It is more preferred that the nominal value of x is from 0.75≤x≤0.9.

The feed stream (b) contains the anions for precipitation with a concentration from 0.001-14 (mol anion/L). The stream (b) is selected from NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, $K_2C_2O_4$, or any combination of the species listed.

The feed stream (d) contains the chelating agents added to the reactor at a concentration from 0.001-14 (mol chelating agent/L). The feed stream (d) is selected from ammonia hydroxide, ammonium chloride, ammonium sulfate, ammonium dihydrogen phosphate, ethylene glycol, carboxylic acids, ammonium nitrate, glycerol, 1,3 propane-diol, urea, N,N'-dimethylurea, quaternary ammonia salts, or any combination thereof.

The feed stream (e, f, . . . , z) may contain additional solvents, surface acting agents, de-foaming agents, or dopants. For dopants, since they become part of the final product, the total concentration of dopant species should be less than 5% of the mol % of the final material.

In some instances, the metal cations in the feed stream (a) may include at least two of Ni, Mn and Co. For example, the metal cations may include Ni—Mn, or Co—Mn, or Co—Ni, or Ni—Mn—Co. In a specific embodiment, the metal cations include Ni—Mn—Co.

In some instances, at least one of the metal cations may have a concentration which changes not linearly with respect to the reaction time over the period from $t_1$ to $t_2$.

In some instances, each of the metal cations may have a concentration which changes not linearly with respect to the reaction time over the period from $t_1$ to $t_2$.

In specific embodiments, the metal cations in the feed stream (a) include Ni, Mn and Co, and at least two of Ni, Mn and Co may have a concentration which changes not linearly with respect to the reaction time over the period from $t_1$ to $t_2$.

In the reactor, the feed stream (a) and the feed stream (b) are contacted to form precipitated precursor particles. At least one transition metal component in the finally formed particle has a non-linear continuous concentration gradient profile over at least a portion along a thickness direction of the particle, as shown in FIGS. 1-7, wherein different examples are given when $t_0=t_1<t_2=t_f$, $t_0<t_1<t_2<t_f$, $t_0<t_1<t_2=t_f$, or $t_0=t_1<t_2<t_f$.

Figure 1:
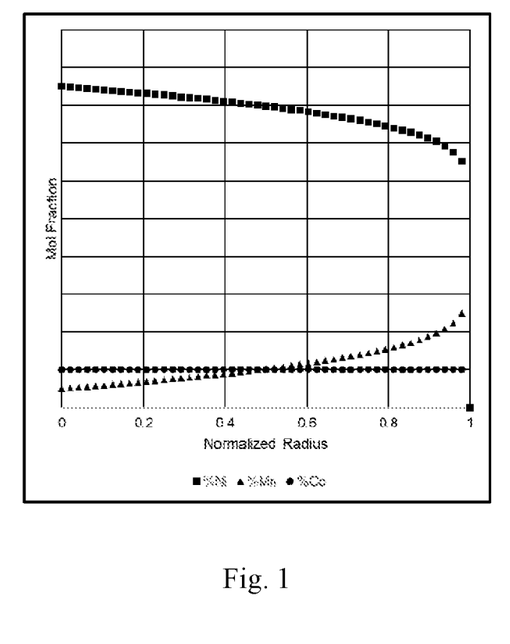
FIG. 1 is the example of precursor particle concentration gradient profile with Ni—Mn changing, Co constant, wherein $t_0=t_1<t_2=t_f$.

In the example as shown in FIG. 1, the metal cation ratio in the feed stream (a) is continuously changed over the period from $t_1$ to $t_2$, wherein $t_0=t_1<t_2=t_f$. The precipitated precursor particle has a non-linear continuous concentration gradient profile with Ni—Mn changing, Co constant.

Figure 2:
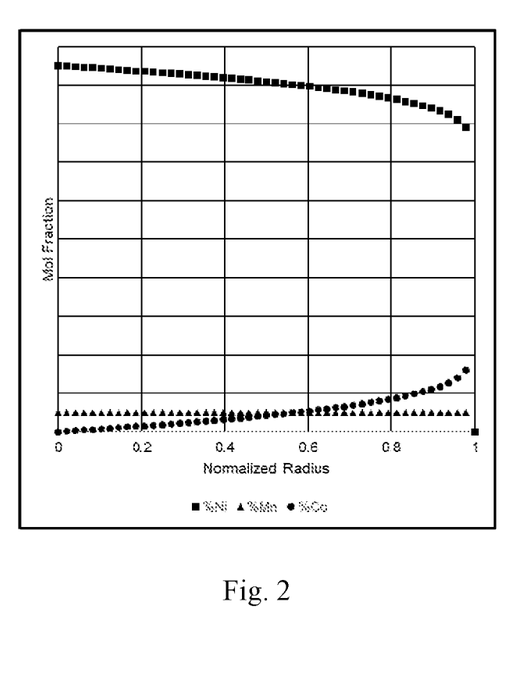
FIG. 2 is the example of precursor particle concentration gradient profile with Ni—Co changing, Mn constant, wherein to $=t_1<t_2=t_f$.

In the example as shown in FIG. 2, the metal cation ratio in the feed stream (a) is continuously changed over the period from $t_1$ to $t_2$, wherein $t_0=t_1<t_2=t_f$. The precipitated precursor particle has a non-linear continuous concentration gradient profile with Ni—Co changing, Mn constant.

Figure 3:
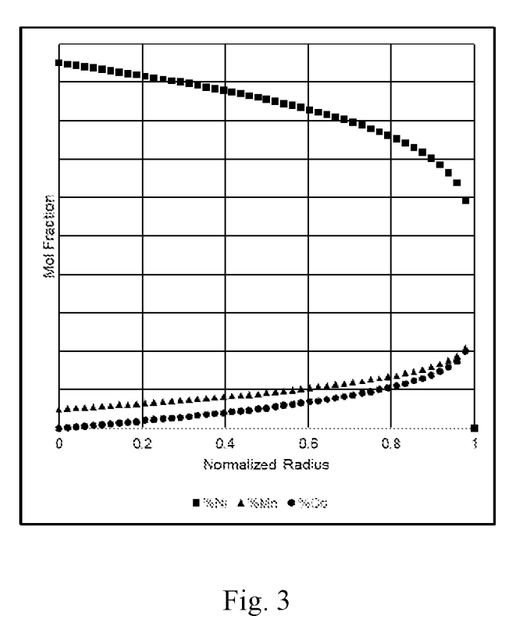
FIG. 3 is the example of precursor particle concentration gradient profile with Ni—Mn—Co changing, wherein to $=t_1<t_2=t_f$.

In the example as shown in FIG. 3, the metal cation ratio in the feed stream (a) is continuously changed over the period from $t_1$ to $t_2$, wherein $t_0=t_1<t_2=t_f$. The precipitated precursor particle has a non-linear continuous concentration gradient profile with Ni—Mn—Co changing.

Figure 4:
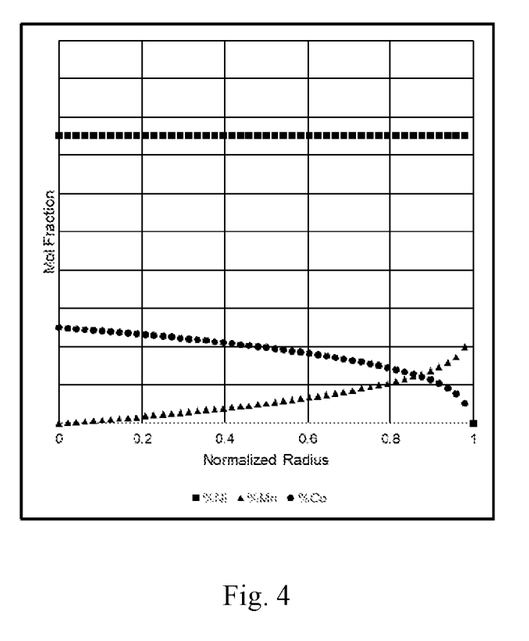
FIG. 4 is the example of precursor particle concentration gradient profile with Mn—Co changing, Ni constant, wherein to $=t_1<t_2=t_f$.

In the example as shown in FIG. 4, the metal cation ratio in the feed stream (a) is continuously changed over the period from $t_1$ to $t_2$, wherein $t_0=t_1<t_2=t_f$. The precipitated precursor particle has a non-linear continuous concentration gradient profile with Mn—Co changing, Ni constant.

Figure 5:
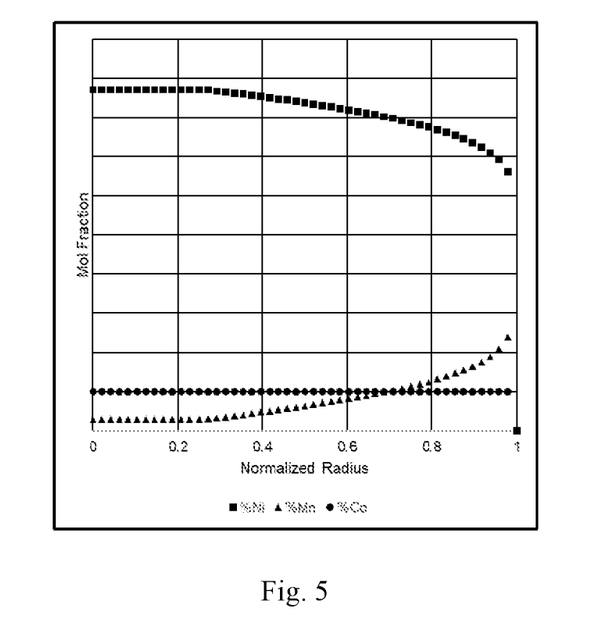
FIG. 5 is the example of precursor particle concentration gradient profile with Ni—Mn changing, Co constant, wherein to $<t_1<t_2=t_f$.

In the example as shown in FIG. 5, the metal cation ratio in the feed stream (a) is continuously changed over the period from $t_1$ to $t_2$, wherein $t_0<t_1<t_2=t_f$. The precipitated precursor particle has a non-linear continuous concentration gradient profile with Ni—Mn changing, Co constant.

Figure 6:
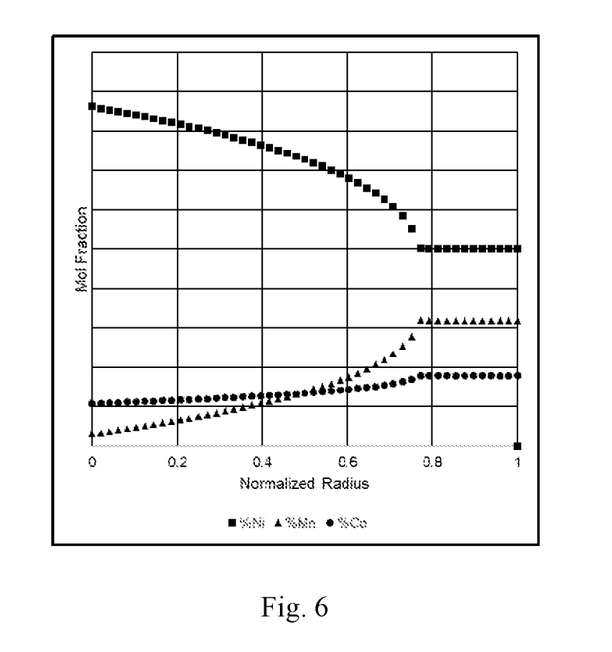
FIG. 6 is the example of precursor particle concentration gradient profile with Ni—Mn—Co changing, wherein to $=t_1<t_2<t_f$.

In the example as shown in FIG. 6, the metal cation ratio in the feed stream (a) is continuously changed over the period from $t_1$ to $t_2$, wherein $t_0=t_1<t_2<t_f$. The precipitated precursor particle has a non-linear continuous concentration gradient profile with Ni—Mn—Co changing.

Figure 7:
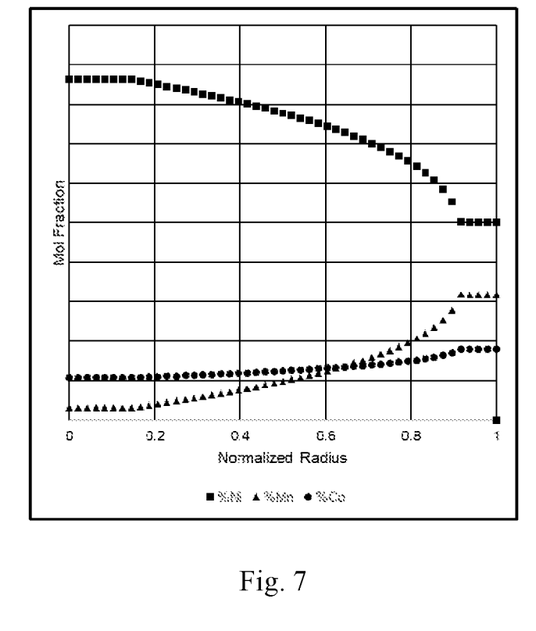
FIG. 7 is the example of precursor particle concentration gradient profile with Ni—Mn—Co changing, wherein to $<t_1<t_2<t_f$.

In the example as shown in FIG. 7, the metal cation ratio in the feed stream (a) is continuously changed over the period from $t_1$ to $t_2$, wherein $t_0<t_1<t_2<t_f$. The precipitated precursor particle has a non-linear continuous concentration gradient profile with Ni—Mn—Co changing.

After the co-precipitation reaction, the slurry of precipitated precursor particles is drained out from the precipitation reactor by the outflow stream (c) and is collected in a hold up tank or directly fed to a solid-liquid filtration device. The filtration device may be a plate and frame filter, candlestick filter, centrifuge, vacuum drum filter, pressure drum filter, hydrocyclone, Nutsche filter, clarifier, or any combination thereof. The filtered precipitated particles must be washed to remove byproduct salts from the precipitation reactions.

The filtered precipitated particles (i.e., filter cake) is then dried under vacuum, N2, Ar or Air for 3-24 hours between 80-200° C.

Once dried, the particles are contacted with a lithium precursor and well mixed. The lithium source is selected from LiOH*H$_2$O, Li$_2$CO$_3$, LiNO$_3$, lithium acetate, lithium metal or Li$_2$O. Lithium hydroxide and lithium carbonate are the preferred choice. The Li to metal cation ratio is between 0.5-1.5, and preferred from 0.9-1.15, and more preferably from 1.01-1.10.

The well mixed lithium source and precipitated precursor particles are then calcined from 300-950° C., and multiple hold temperatures and ramp rates may be used. Preferably at least one hold temperature from 300-500° C. for 2-20 hours will occur before another heating from 700° C. to 850° C. for 2-20 hours. The ramp rate during heating may be from 0.5 to 10 degrees per minute, and 2-5 degrees per minute is preferred. The calcination time is from 2 hours to 48 hours.

The calcination atmosphere is selected from N2, air, dried air, oxygen or any combination thereof. The reaction temperature is a critical item for concentration gradient materials, since too high, too long, or a combo of the two may cause so much cation diffusion that a gradient is no longer present in the final cathode particle.

To characterize the precipitated cathode active material concentration gradient powders elemental analysis, SEM (scanning electron microscope), residual lithium analysis and particle size distributions can be utilized. The presence of a concentration gradient can be confirmed by depth profiling a particle or via cross-sectioning a particle and using an EDS (energy dispersive spectrdmeter) line scan or electron microprobe analyzer.

The precipitated cathode material particles can be characterized using the particle size distribution D10, D50, D90 or the Sauter mean diameter, $d_{32}$, where:

$$d_{32} = \frac{\sum_{k=1}^{N} n_k d_k^3}{\sum_{k=1}^{N} n_k d_k^2}$$

where $n_k$ is the relative fraction and $d_k$ is the bin diameter from the particle size distribution. The particle size distribution can be collected via a light scattering instrument.

The prepared particles will have a Sauter mean diameter between 0.5-30 um, preferably from 1-15 um.

The residual Li is determined using pH measurements and acid titrations of cathode material filtrate.

The resulting material is a concentration gradient cathode active material. The active material, possibly mixed with a binder and conductive particle, is cast on a metallic foil to form a cathode electrode. The cathode electrode can be used in a lithium-ion battery.

To test the cathode material performance, galvanotactic charge-discharge tests can be performed. The material capacity, cycle retention, rate performance and cycle efficiency can all then be determined.

Figure 8:
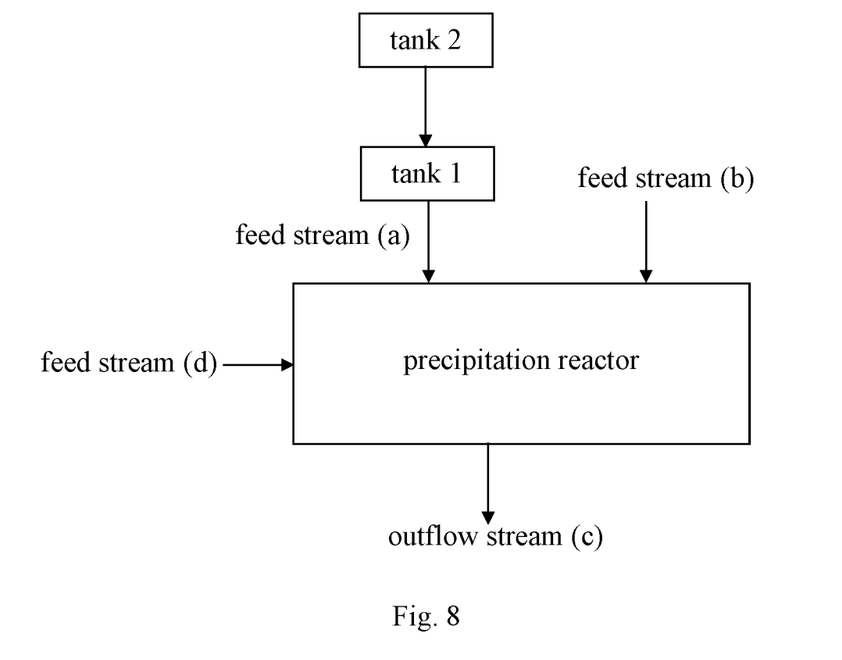
FIG. 8 is a block diagram for preparing cathode particles according to one embodiment.

Referring to FIG. 8, in one embodiment, the precipitation reactor is connected with a first tank (tank 1) containing a first transition metal solution. Tank 1 is connected with a second tank (tank 2) containing a second transition metal solution. The first transition metal solution has a metal cation ratio of $A_1$, and the second transition metal solution has a metal cation ratio of $A_2$. The second transition metal solution in tank 2 begins to feed into tank 1 from time $t_1$ and is mixed with the first transition metal solution. The mixed transition metal solutions are fed into the reactor from tank 1 over the period from $t_1$ to $t_2$.

In more detail, the first transition metal solution in tank 1 is fed into the reactor over the period from $t_0$ to $t_2$, and the second transition metal solution in tank 2 is fed into tank 1 over the period from $t_1$ to $t_f$. That is, no second transition metal solution is fed into tank 1 from tank 2 over the period from $t_0$ to $t_1$, a mixture of the first transition metal solution and the second transition metal solution is fed into the reactor from tank 1 over the period from $t_1$ to $t_2$, and no first transition metal solution is fed into the reactor from tank 1 over the period from $t_2$ to $t_f$. In particular, a flowrate leaving tank 1 and fed into the reactor is $F_1$, and a flowrate leaving tank 2 and fed into tank 1 is $F_2$, wherein $F_1$ is greater than $F_2$, such that all of the first transition metal solution in tank 1 has been fed into the reactor at time $t_2$, and the second transition metal solution in tank 2 is directly fed into the reactor via tank 1 over the period from $t_2$ to $t_f$. As a result, during the period from $t_0$ to $t_1$, the metal cation ratio in the feed stream (a) is maintained constant at $A_1$; during the period from $t_1$ to $t_2$, the metal cation ratio in the feed stream (a) is continuously changed from $A_1$ to $A_2$; and during the period from $t_2$ to $t_f$, the metal cation ratio in the feed stream (a) is maintained constant at $A_2$.

For the present embodiment, agitation may be necessary to ensure the second transition metal solution mixes adequately with the first transition metal solution in tank 1 during the period from $t_1$ to $t_2$.

In the present embodiment, the first transition metal solution has a volume $V_1$ at time $t_1$, the second transition metal solution has a volume $V_2$ at time $t_1$, wherein $V_1 \geq V_2$.

In some cases, the feed stream (a) is prepared by contacting a first transition metal solution from tank 1 of concentration $C_1$, volume $V_1$, metal cation ratio $A_1$ at time $t_1$ with a second transition metal solution from tank 2 of concentration $C_2$, volume $V_2$, metal cation ratio $A_2$ between time $t_1$ and $t_2$. For the proposed embodiment, the concentration $C_1 \neq C_2$, the volume $V_1 = V_2$ and the flowrate $F_1 = F_2$, it is still possible to achieve a non-linear concentration gradient. For the present embodiment, agitation may be necessary to ensure the second transition metal solution mixes adequately with the first transition metal solution in tank 1 during the period from $t_1$ to $t_2$.

In a preferred embodiment, $C_1 > 1.5$ mol/L and $C_2$ is above 0.1 mol/L. More preferred is $C_1 > 2$ mol/L and $C_2 > 1$ mol/L.

In some embodiments, the feed concentrations $C_1 \neq C_2$, volumes $V_1 \neq V_2$.

Figure 9:
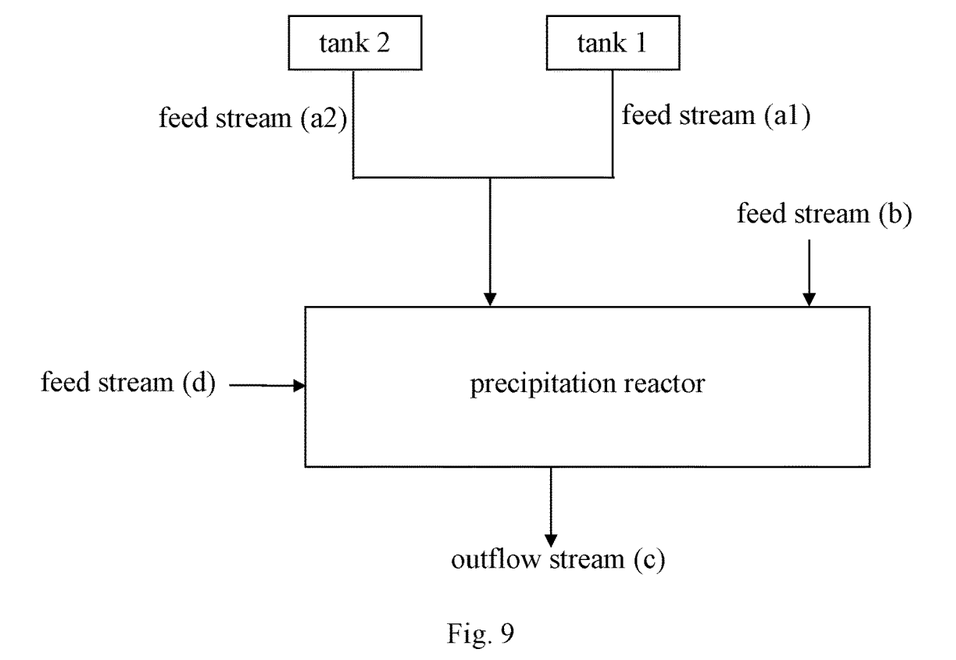
FIG. 9 is a block diagram for preparing cathode particles according to another embodiment.

Referring to FIG. 9, in another embodiment, the precipitation reactor is connected with a first tank (tank 1) containing a first transition metal solution, and the precipitation reactor is further connected with a second tank (tank 2) containing a second transition metal solution. The first transition metal solution has a metal cation ratio of $A_1$, and the second transition metal solution has a metal cation ratio of $A_2$. The second transition metal solution in tank 2 begins to feed into the reactor from time $t_1$.

In more detail, the first transition metal solution in tank 1 is fed into the reactor over the period from $t_0$ to $t_2$, and the second transition metal solution in tank 2 is fed into the reactor over the period from $t_1$ to $t_f$. That is, no second transition metal solution is fed into the reactor from tank 2 over the period from $t_0$ to $t_1$, and no first transition metal solution is fed into the reactor from tank 1 over the period from $t_0$ to $t_f$. During the period from $t_1$ to $t_2$, the first transition metal solution in tank 1 and the second transition metal solution in tank 2 are concurrently fed into the reactor. As a result, during the period from $t_0$ to $t_1$, the metal cation ratio in the feed stream (a) is maintained constant at $A_1$; during the period from $t_1$ to $t_2$, the metal cation ratio in the feed stream (a) is continuously changed from $A_1$ to $A_2$; and during the period from $t_0$ to $t_f$, the metal cation ratio in the feed stream (a) is maintained constant at $A_2$.

In this embodiment, tank 1 has a feed stream (a1) into the reactor, tank 2 has a feed stream (a2) into the reactor, wherein the feed stream (a) is the sum of the feed stream (a1) and the feed stream (a2). The feed stream (a1) and the feed stream (a2) are contacted and mixed in a mixing apparatus before they are fed into the reactor. The contacting between the feed stream (a1) and the feed stream (a2) is done through non-mechanical agitation by ensuring the fluids Reynold number is in the turbulent regime. The fluid contact mixing may occur in a mixing pipe, pipe tee, impinging jet, inlet vortex mixer or any other appropriate mixing apparatus that does not require mechanical agitation. The flowrate of the feed stream (a1) which leaves tank 1 is $F_1$, and the flowrate of the feed stream (a2) which leaves tank 2 is $F_2$. The flowrates of $F_1$ and $F_2$ between $t_1$ and $t_2$ are defined as:

$F_1=f(t)$; $F_1 \geq 0$; $F_2 \geq f(t)$; $F_2 \geq 0$; $F_1 \neq F_2$; and $F_1' \neq 0$; $F_2' \neq 0$ during the time $t_1$ to $t_2$.

In a preferred embodiment, $F_1'' \neq 0$; and $F_2'' \neq 0$.

Under these conditions, the resulting concentration profile for at least one species of the metal cations in the stream (a) will be non-linear. As stated prior, this means the formed particle will have a non-linear concentration gradient profile. The apostrophes after $F_1$ and $F_2$ above denote the order of the derivative.

In this embodiment, the solution volumes $V_1$ and $V_2$ in the tanks can be any value, given enough solution is available to provide the needed volume to the precipitation reactor. In addition, the metal cation ratios $A_1$ and $A_2$ do not change in the tanks, but instead remain constant during the entire course of the reaction.

Using the inventive method, concentration gradient particles can be prepared that have a non-linear concentration gradient over at least a portion along a thickness direction of the particle. By adopting the non-linear profile of the concentration gradient particles, particularly full concentration gradient particles, it can increase the metal content of a specified species without changing the gradient endpoints. This is especially important so the particle surface can be maintained, since the surface composition directly impacts the cycle stability and thermal stability of the material.

The capacity retention of the inventive material will be improved compared to NMC with identical nominal composition prepared under similar conditions.

The capacity retention of the inventive material will be improved compared to a concentration gradient material prepared under similar conditions and of identical nominal composition, identical starting composition, but with ratio $A_2$ adjusted to form a linear gradient.

Cathode active materials prepared from precipitated particles that have a non-linear concentration gradient will have a higher nominal content of at least one of Ni, Mn, or Co than a cathode active material prepared from a linear concentrations gradient particle with similar gradient endpoints and duration. It is preferred that Ni is the metal ion selected for an increase in the nominal concentration because higher Ni at NMC materials have higher capacities.

In the embodiment of FIG. 9, contacting the concentration gradient feed compositions without mechanical agitation solves the difficulty of mixing and utilizing the concentration gradient feed solution towards the end of reaction, and helps stop slight batch to batch differences in nominal metal composition and surface composition if the concentration gradient ends at $t_2=t_f$, while in the embodiment of FIG. 8, low volumes of the tanks are difficult to pump completely.

In the embodiment of FIG. 9, the solution volumes of $V_1$ and $V_2$ also no longer must be tightly controlled during the reaction, allowing new transition metal solutions to be added to the tanks during reaction, single feed tanks to supply solution to multiple reactors, and facilitates more complicated concentration gradient profiles, for example with peaks and valleys in the profiles, since the feed composition can be any value that is a linear combination of $A_1$ and $A_2$.

EXAMPLES FOR NON-LINEAR PROCESS

Example 1

A 20 L glass reactor is initially filled with 5 L of 13.6 g/L aqua ammonia solution. The solution is heated to 50 Celsius via the glass reactor heating jacket, while being sparged with 5 mL/min N2 gas and under mild agitation. The reactor has an inlet pipe for NaOH, NH3*H2O and MSO4 solution addition. Once the reactor is at temperature, the pH is adjusted to 11.9 through careful addition of 6 mol/L NaOH, and henceforth remained at that value during the trial duration via a pH control meter and pump.

At the start of the reaction time, impeller for agitation is increased to 300 rpm, and flows of NaOH, NH3*H2O and MSO4 are started to feed into the reactor. The NH3*H2O stream is fed at 45 mL/hr, and has a concentration of 136 g/L of NH3. The MSO4 tank 1 feeding directly to the reactor starts at 3 L in volume, feeds at a rate of 250 mL/hr, and is consisted of a 2 mol/L metal sulfate composition that has Ni:Mn:Co ratio of 90:0:10 at the start of reaction. At the same time, a MSO4 tank 2 starts flow into tank 1, having a volume of 2 L with a flowrate of 100 mL/hr and consisting of a 2 mol/L MSO4 composition that has Ni:Mn:Co ratio of 65:25:10. To prepare the metal sulfate solutions, the appropriate amounts of NiSO4*6H2O, MnSO4*H2O and CoSO4*7H2O are dissolved in DI water.

After the reaction, the particle suspension is drained from the reactor and filtered using copious amounts of DI water, before drying the particles overnight at 100 Celcius under $N_2$. The dried particles are then mixed with LiOH*H2O in a 1.05:1 Li:(Ni+Mn+Co) ratio, and is calcined in a tube furnace under oxygen atmosphere at 500 Celcius for 3 hrs, followed by 800 Celsius for 10 hrs and natural cooling.

In Table 1, the ICP composition compared to the expected average if the particle transition metal gradient is linear from the core to surface of the material is shown.

Figure 10:
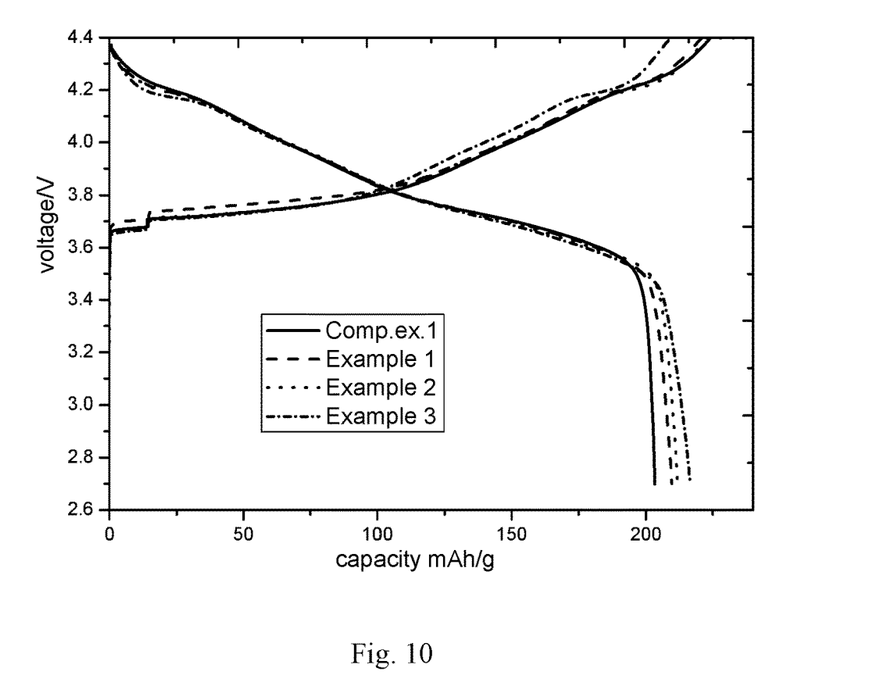
FIG. 10 is the first cycle charge and discharge curves in lithium-ion battery half-cell for various prepared active materials.

The first cycle charge and discharge curves in lithium-ion battery half-cell for various prepared active materials are shown in FIG. 10.

Example 2

Same conditions as example 1 except the metal sulfate tank 1 has initially 3.4 L of solution, and the tank 2 is 1.6 L in volume with an outflow rate of 80 mL/hr.

Example 3

Same conditions as example 1 except the metal sulfate tank 1 has initially 4 L of solution, and the tank 2 is 1 L in volume with an outflow rate of 50 mL/hr.

The material is calcined at 500 Celcius for 3 hrs, followed by 750 Celsius for 15 hrs using 5 degree per minute ramp rate and then natural cooling.

Comparative Example 1

Same conditions as example 1 except the metal sulfate tank 1 has 2.5 L of solution, and the tank 2 is 2.5 L in volume with an outflow rate of 125 mL/hr.

Comparative Example 2

A 500 L stainless steel reactor is initially filled with 125 L of 13.6 g/L aqua ammonia solution. The solution is heated to 50 Celsius via a heating jacket, while being sparged with 10 L/min N2 gas and under mild agitation. The reactor has an inlet pipe for NaOH, NH3*H2O and MSO4 solution addition. Once the reactor is at temperature, the pH is adjusted to 11.9 through careful addition of 10.8 mol/L NaOH, and henceforth remained at that value during the trial duration via a pH control meter and pump.

At the start of the reaction time, the 500 L impeller is increased to 500 rpm, and flows of NaOH, NH3*H2O and MSO4 are started to feed into the reactor. The NH3*H2O stream is fed at 600 mL/hr, and has a concentration of 227 g/L of NH3. The MSO4 tank 1 feeding directly to the reactor starts at 120 L in volume, feeds at a rate of 10 L/hr, and is consisted of a 2 mol/L metal sulfate composition that has Ni:Mn:Co ratio of 90:0:10 at the start of reaction. At the same time, a MSO4 tank 2 starts flow into tank 1, having a volume of 120 L with a flowrate of 5 L/hr and consisting of a 2 mol/L MSO4 composition that has Ni:Mn:Co ratio of 65:25:10. To prepare the metal sulfate solutions, the appropriate amounts of NiSO4*6H2O, MnSO4*H2O and CoSO4*7H2O are dissolved in DI water.

Example 4

Same conditions as comparative example 2 except tank 1 has 180 L volume, and tank 2 has 60 L volume and an outflow rate of 2.5 L/hr.

Example 5

Same conditions as example 4 except tank 1 has Ni:Mn:Co sulfate ratio of 90:5:5, and tank 2 has Ni:Mn:Co sulfate ratio 60:20:20.

Example 6

Same conditions as example 5 except tank 1 has Ni:Mn:Co sulfate ratio of 95:3:2.

Example 7

Same conditions as example 6 except tank 1 has 160 L starting volume with starting Ni:Mn:Co sulfate ratio of 90:8:2. Tank 2 has starting volume of 80 L and an outflow rate of 3.33 L/hr.

Example 8

Same conditions as example 4 except tank 1 has Ni:Mn:Co sulfate ratio of 90:10:0, and tank 2 has Ni:Mn:Co sulfate ratio 50:40:10 at start of reaction.

TABLE 1

| Sample | Tank 1 Ni (%) | Tank 1 Mn (%) | Tank 1 Co (%) | Tank 2 Ni (%) | Tank 2 Mn (%) | Tank 2 Co (%) | (Tank 1 Composition + Tank 2 Composition)/2 Ni (%) | Mn (%) | Co (%) | Actual Composition (ICP) Ni (%) | Mn (%) | Co (%) |
|---|---|---|---|---|---|---|---|---|---|---|---|---|
| Ex. 1 | 90 | 0 | 10 | 65 | 25 | 10 | 77.5 | 12.5 | 10 | 80.31 | 10.10 | 9.59 |
| Ex. 2 | 90 | 0 | 10 | 65 | 25 | 10 | 77.5 | 12.5 | 10 | 81.90 | 8.06 | 10.03 |
| Ex. 3 | 90 | 0 | 10 | 65 | 25 | 10 | 77.5 | 12.5 | 10 | 85.01 | 4.95 | 10.03 |
| Comp. Ex. 1 | 90 | 0 | 10 | 65 | 25 | 10 | 77.5 | 12.5 | 10 | 77.30 | 12.53 | 10.17 |
| Comp. Ex. 2 | 90 | 0 | 10 | 65 | 25 | 10 | 77.5 | 12.5 | 10 | 77.80 | 12.00 | 10.20 |
| Ex. 4 | 90 | 0 | 10 | 65 | 25 | 10 | 77.5 | 12.5 | 10 | 84.00 | 5.90 | 10.20 |
| Ex. 5 | 90 | 5 | 5 | 60 | 20 | 20 | 75 | 12.5 | 12.5 | 82.10 | 8.90 | 9.00 |
| Ex. 6 | 95 | 3 | 2 | 60 | 20 | 20 | 77.5 | 11.5 | 11 | 86.2 | 7.1 | 6.7 |
| Ex. 7 | 90 | 8 | 2 | 60 | 20 | 20 | 75 | 14 | 11 | 79.8 | 11.9 | 8.3 |
| Ex. 8 | 90 | 10 | 0 | 50 | 40 | 10 | 70 | 25 | 5 | 80.1 | 17.3 | 2.5 |

TABLE 2

| Sample | D[3, 2] (um) | D50 (um) | BET (sq · m/g) | Tap Density (g/cc) |
|---|---|---|---|---|
| Comp. Ex. 2 | 7.91 | 8.21 | 5.5 | 1.97 |
| Example 4 | 11.06 | 11.41 | 7.2 | 2.00 |
| Example 5 | 12.25 | 12.73 | 7.9 | 2.04 |
| Example 6 | 11.24 | 11.60 | 7.6 | 2.04 |
| Example 7 | 12.08 | 12.47 | 5.3 | 2.02 |
| Example 8 | 8.25 | 8.58 | 4.7 | 1.98 |
| Example 9 | 11.50 | 12.4 | 8.87 | 1.93 |

Example 9

500 L of 13.6 g/L aqua ammonia solution is fed into a 2,000 L reactor. The reactor is sparged with N2, and heated via a jacket to 50 degrees Celsius. At the start of the reaction, 170 g/L NH3*H2O solution and MSO4*xH2O solution are added to the reactor separately, while another feed of 10 mol/L NaOH is feed via a pump connected to a pH controller set for 11.9. During the trial, two solutions of metal sulfate are mixed via non-mechanical agitated contact in a pipe tee, with the inlet flow of each solution into the tee varying with time. The metal sulfate solutions has Ni:Mn:Co ratios of 90:0:10 and 65:25:10, respectively.

Figure 11:
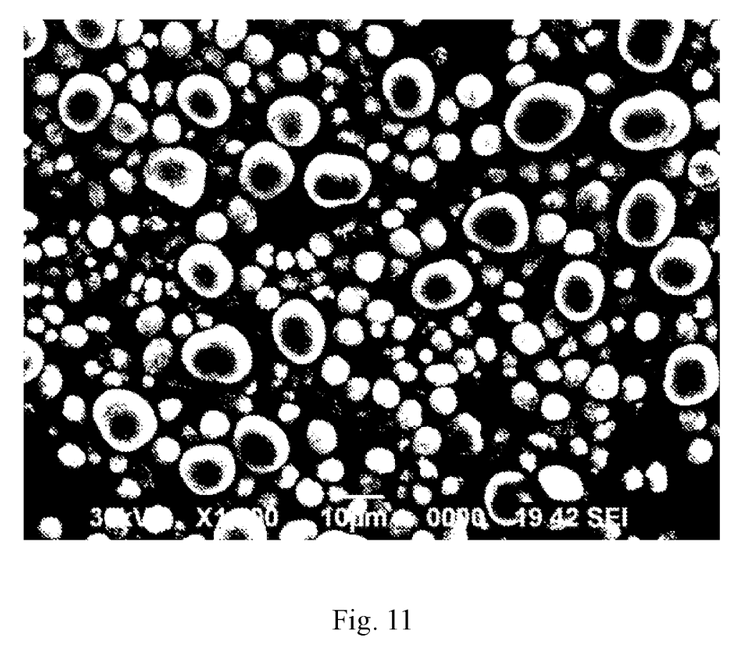
FIG. 11 is the SEM of precursor particles prepared using inventive method in Example 9.

The SEM of precursor particles prepared using inventive method in Example 9 is shown in FIG. 11.

Example 10

Figure 12:
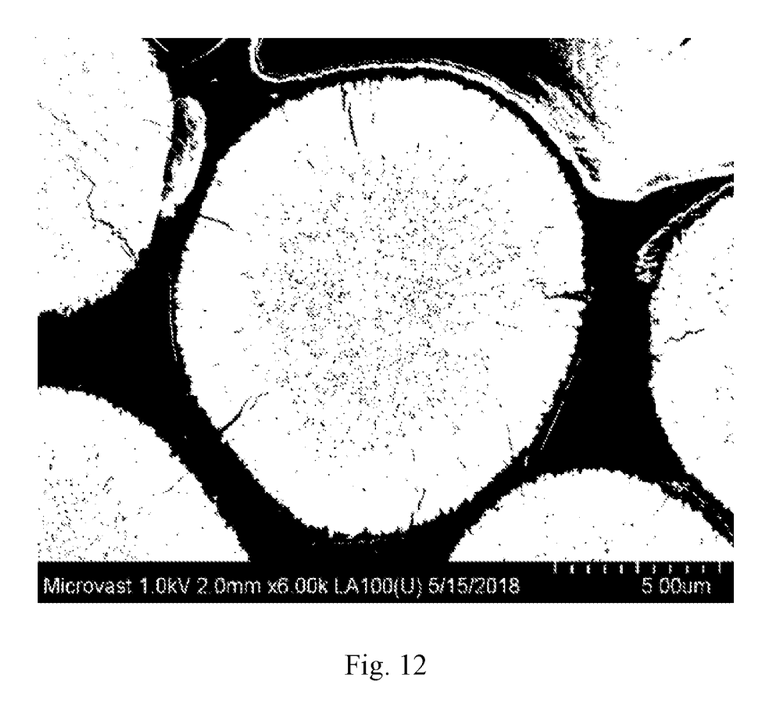
FIG. 12 is the cross section of precursor particle in Example 1, as described in Example 10.
Figure 13:
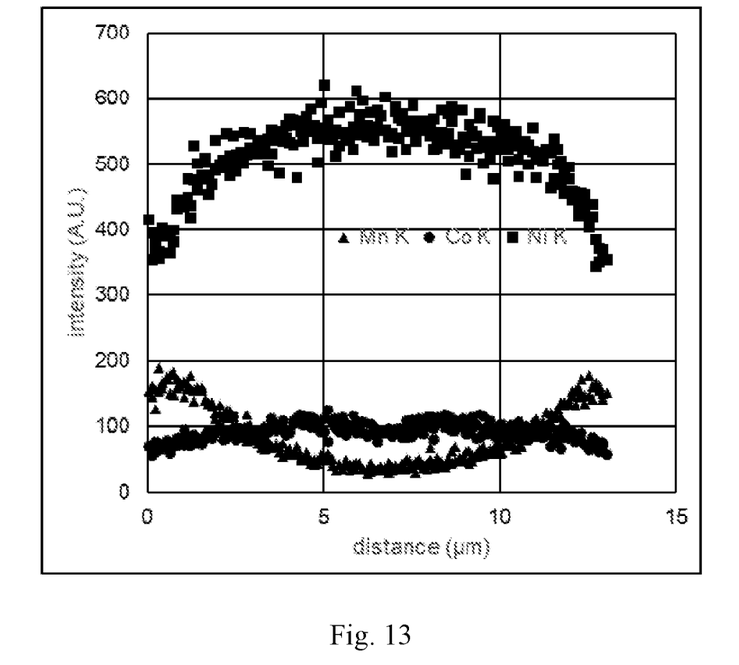
FIG. 13 is the EDS line scan intensity for Ni, Mn and Co for Example 1 precursor particle.

The precursor particle of Example 1 is cross sectioned via focused ion beam milling, and then analyzed using an EDS line scan in the SEM. The cross sectioned particle is shown in FIG. 12, and the K-alpha intensity for Ni, Mn and Co clearly showing the transition metal profile is shown in FIG. 13.

Example 11

Figure 14:
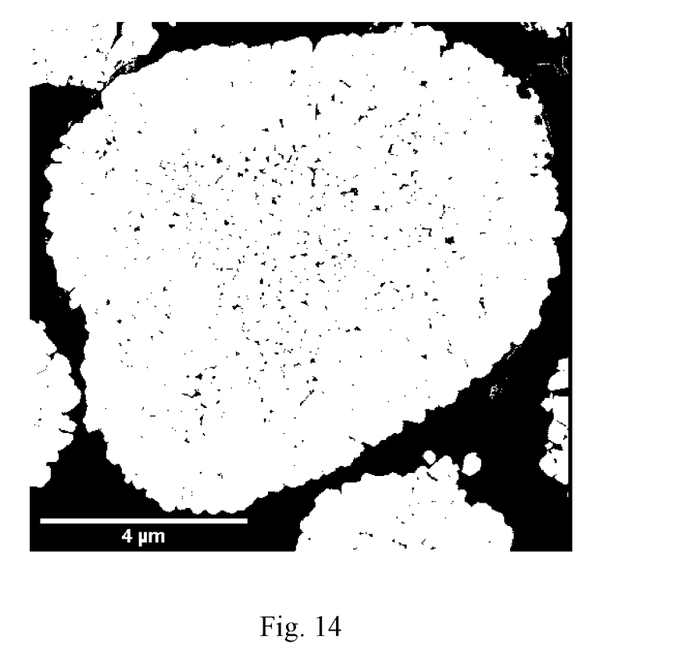
FIG. 14 is the SEM of cross sectioned active material described in Example 11.
Figure 15:
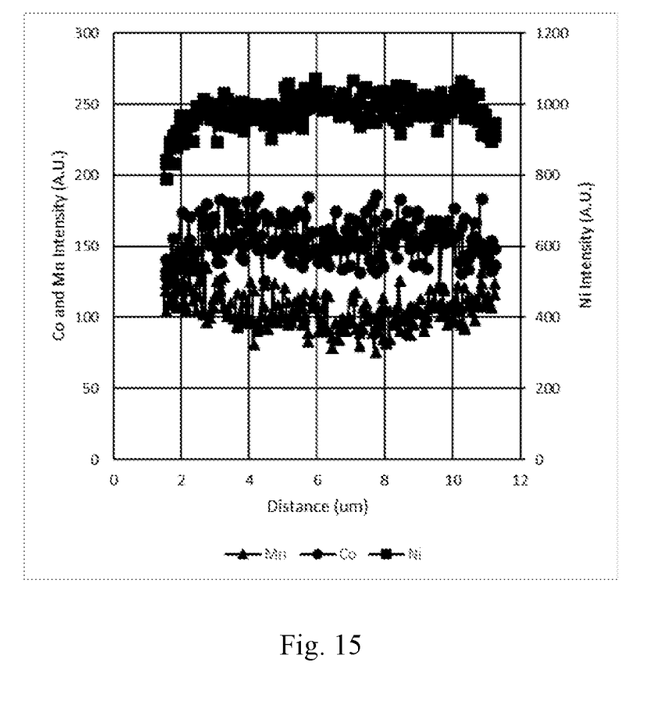
FIG. 15 is the EDS line scan intensity of cross sectioned final active material described in Example 11.

The material described in Example 3 is made using the inventive procedure, but this time cross sectioned using the procedure described in Example 10. The SEM of the cross sectioned active material described in Example 11 is shown in FIG. 14. The EDS line scan intensity of cross sectioned final active material described in Example 11 is shown in FIG. 15.

Example 12

A 20 L glass reactor is initially filled with 5 L of 13.6 g/L aqua ammonia solution. The solution is heated to 50 Celsius via the glass reactor heating jacket, while being sparged with 5 mL/min N2 gas and under mild agitation. The reactor has an inlet pipe for NaOH, NH3*H2O and MSO4 solution addition. Once the reactor is at temperature, the pH is adjusted to 11.6 through careful addition of 10.8 mol/L NaOH, and henceforth remained at that value during the trial duration via a pH control meter and pump.

At the start of the reaction time, impeller for agitation is increased to 300 rpm, and flows of NaOH, NH3*H2O and MSO4 are started to feed into the reactor. The NH3*H2O stream is fed at 10 mL/hr, and has a concentration of 193.3 g/L of NH3. The MSO4 tank 1 feeding directly to the reactor starts at 2.5 L in volume, feeds at a rate of 250 mL/hr, and is consisted of a 2.2 mol/L metal sulfate composition that has Ni:Mn:Co ratio of 90:0:10 at the start of reaction. At the same time, a MSO4 tank 2 starts flow into tank 1, having a volume of 2.5 L with a flowrate of 125 mL/hr and consisting of a 1.97 mol/L MSO4 composition that has Ni:Mn:Co ratio of 63.5:26.5:10. To prepare the metal sulfate solutions, the appropriate amounts of NiSO4*6H2O, MnSO4*H2O and CoSO4*7H2O are dissolved in DI water.

Figure 16:
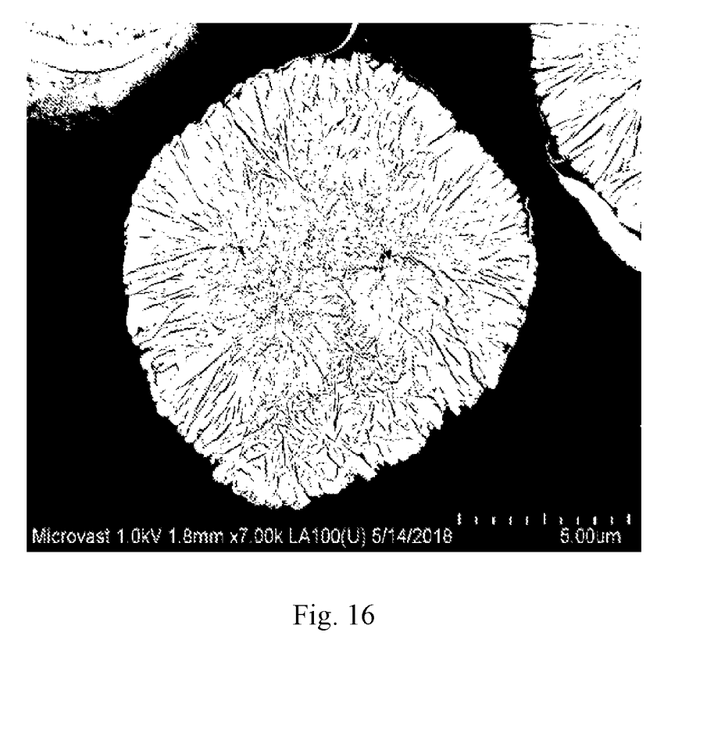
FIG. 16 is the SEM of cross sectioned precursor particle in Example 12.
Figure 17:
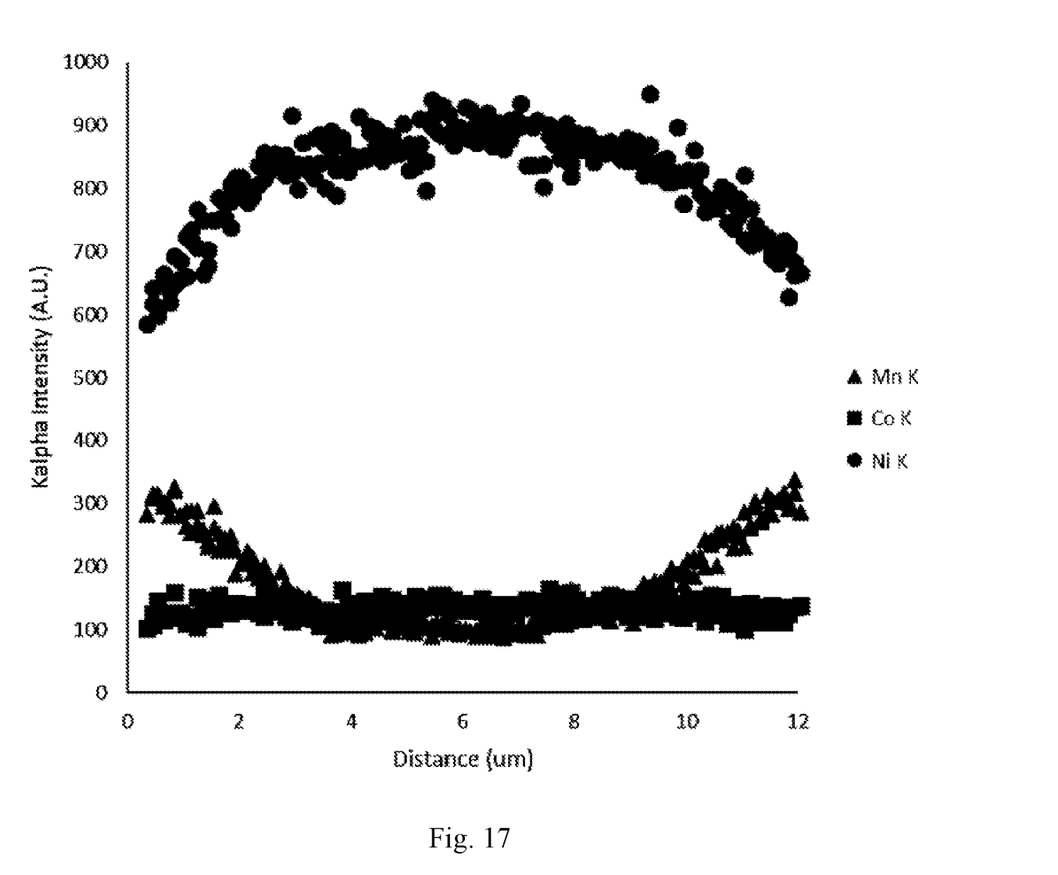
FIG. 17 is the EDS line scan intensity for Ni, Mn and Co for precursor particle in Example 12.

The SEM of cross sectioned precursor particle in Example 12 is shown in FIG. 16. The EDS line scan intensity for Ni, Mn and Co for precursor particle in Example 12 is shown in FIG. 17.

Example 13

The same procedure as Example 12 is used, except the tank 2 is a 2 mol/L metal sulfate solution that has Ni:Mn:Co ratio of 57:33:10.

Example 14

Same procedure as Example 13 except tank 1 has 3 L volume at the start of reaction, and tank 2 has 2 L volume and an outflow rate of 100 mL/hr into tank 1.

Cross sections of materials are prepared by cross section polisher (Hitachi IM4000, Hitachi High-Technologies Corporation). The specific surface area is calculated via adsorption analysis using nitrogen (BET, JW-BK400, Bei Jing JWGB Sci & Tech Co., Ltd.). Particle sizes are analyzed using a Mastesizer 2000 (Malvern). The Li and transition metal content is confirmed using inductively coupled plasma-mass spectroscopy (Optima 8000, Perkin Elmer) analysis.

Electrochemical Characterization

The prepared active materials are tested in lithium half-cells using 2035 coin cells. The active material (90%), SuperP (5%) and PVDF (5%) are mixed in NMP and then cast onto aluminum foil using the doctor blade method. The electrodes are dried at 120 Celsius then roll pressed slightly to improve the electrode conductivity. The electrode is then punched into disks, and added to a coin cell with a PE separator, Li disk for anode, and is flooded with 1 mol/L LiPF6 carbonate electrolyte. The cells are tested from 2.7-4.4V, and during the first cycle 0.05 C charge for 1.5 hrs, then 0.1 C CCCV (until 0.01 C cutoff), while discharge is 0.1 C. C is defined as 200 mAh/g.

What is claimed is:

1. A method of preparing cathode particles using a co-precipitation reaction in a reactor, comprising:
   feeding a feed stream (a) containing metal cations into the reactor, the metal cations including at least one transition metal component;
   feeding a feed stream (b) containing anions into the reactor;
   wherein a composition ratio of the metal cations to each other in the feed stream (a) is continuously changed from $A_1$ at time $t_1$ to $A_2$ at time $t_2$;
   wherein the feed stream (a) and the feed stream (b) are contacted in the reactor to form precipitated precursor particles, and the at least one transition metal component in the particle has a non-linear continuous concentration gradient profile over at least a portion along a thickness direction of the particle.

2. The method of claim 1, wherein the composition ratio of the metal cations in the feed stream (a) is fixed at Ai over the period from $t_0$ to $t_1$, and the composition ratio of the metal cations in the feed stream (a) is fixed at $A_2$ over the period from $t_2$ to $t_f$, wherein $t_0$ and $t_f$ are defined respectively as the start time and the end time of the co-precipitation reaction, wherein $t_0 \leq t_1 < t_2 \leq t_f$.

3. The method of claim 2, wherein $t_0 = t_1 < t_2 = t_f, t_0 < t_1 < t_2 = t_f, t_0 = t_1 < t_2 < t_f$, or $t_0 < t_1 < t_2 < t_f$.

TABLE 3

| | Tank 1 | | Tank 2 | | | | | ICP | | |
|---|---|---|---|---|---|---|---|---|---|---|
| | Start Vol. | Start. Conc. | Start Vol. | Start* Conc. | Ni/ | Mn/ | Co/ | | | |
| Sample | (L) | (mol/L) | (L) | (mol/L) | NMC | NMC | NMC | Ni | Mn | Co |
| Ex. 12 | 2.5 | 2.2 | 2.5 | 1.97 | 63.5 | 26.5 | 10 | 0.78 | 0.12 | 0.10 |
| Ex. 13 | 2.5 | 2.2 | 2.5 | 2 | 57 | 33 | 10 | 0.74 | 0.16 | 0.10 |
| Ex. 14 | 3 | 2.2 | 2 | 2 | 57 | 33 | 10 | 0.77 | 0.13 | 0.10 |

Physical Characterizations The morphology of materials and electrodes is studied via scanning electron microscopy (Hitachi SU8010, Hitachi High-Technologies Corporation).

4. The method of claim 1, wherein the metal cations in the feed stream (a) are selected from Mg, Ca, Ti, V, Cr, Mn, Fe, Co, Ni, Cu, Al, or any combination thereof.

5. The method of claim 4, wherein the metal cations in the feed stream (a) comprise at least two of Ni, Mn and Co.

6. The method of claim 5, wherein at least one of the metal cations have a concentration which changes not linearly with respect to the reaction time over the period from $t_1$ to $t_2$.

7. The method of claim 6, wherein each of the metal cations has a concentration which changes not linearly with respect to the reaction time over the period from $t_1$ to $t_2$.

8. The method of claim 1, wherein the composition ratio of the metal cations in the feed stream (a) is described as $Ni_xMn_yCo_zMe_{1-x-y-z}$, where $x+y+z\geq0.9$, $z\leq0.4$, and Me is one or more additional elements, wherein the composition ratio $A_1$ is selected from $0.85\leq x\leq1$, $0\leq z\leq0.1$, and the composition ratio $A_2$ is selected from $0.4\leq x\leq0.7$; $0.25\leq y\leq0.5$.

9. The method of claim 1, wherein the reactor is connected with a first tank containing a first transition metal solution, the first tank is connected with a second tank containing a second transition metal solution, the first transition metal solution has a metal cation ratio of $A_1$, the second transition metal solution has a metal cation ratio of $A_2$, the second transition metal solution in the second tank begins to feed into the first tank from time $t_1$ and is mixed with the first transition metal solution, the mixed transition metal solutions are fed into the reactor from the first tank over the period from $t_1$ to $t_2$.

10. The method of claim 9, wherein the first transition metal solution in the first tank is fed into the reactor over the period from $t_0$ to $t_2$, the second transition metal solution in the second tank is fed into the first tank over the period from $t_1$ to $t_f$, no second transition metal solution is fed into the first tank from the second tank over the period from $t_0$ to $t_1$, a mixture of the first transition metal solution and the second transition metal solution is fed into the reactor from the first tank over the period from $t_1$ to $t_2$, and no first transition metal solution is fed into the reactor from first tank over the period from $t_2$ to $t_f$.

11. The method of claim 10, wherein a flowrate leaving the first tank and fed into the reactor is $F_1$, a flowrate leaving the second tank and fed into the first tank is $F_2$, $F_1$ is greater than $F_2$, such that all of the first transition metal solution in the first tank has been fed into the reactor at time $t_2$, and the second transition metal solution in the second tank is directly fed into the reactor via the first tank over the period from $t_2$ to $t_f$.

12. The method of claim 11, wherein the first transition metal solution in the first tank has a volume $V_1$ at time $t_1$, the second transition metal solution in the second tank has a volume $V_2$ at time $t_1$, wherein $V_1\geq V_2$.

13. The method of claim 9, wherein the second transition metal solution feeding into the first tank is mixed adequately with the first transition metal solution in the first tank through agitation during the period from $t_1$ to $t_2$.

14. The method of claim 1, wherein the reactor is connected with a first tank containing a first transition metal solution, the reactor is further connected with a second tank containing a second transition metal solution, the first transition metal solution has a metal cation ratio of $A_1$, the second transition metal solution has a metal cation ratio of $A_2$, the second transition metal solution in the second tank begins to feed into the reactor from time $t_1$.

15. The method of claim 14, wherein the first transition metal solution in the first tank is fed into the reactor over the period from $t_0$ to $t_2$, the second transition metal solution in the second tank is fed into the reactor over the period from $t_1$ to $t_f$, no second transition metal solution is fed into the reactor from the second tank over the period from $t_0$ to $t_1$, the first transition metal solution in the first tank and the second transition metal solution in the second tank are concurrently fed into the reactor over the period from $t_1$ to $t_2$, no first transition metal solution is fed into the reactor from the first tank over the period from $t_2$ to $t_f$.

16. The method of claim 14, wherein the first tank has a feed stream (a1) feeding into the reactor, the second tank has a feed stream (a2) feeding into the reactor, the feed stream (a) is the sum of the feed stream (a1) and the feed stream (a2), the feed stream (a1) and the feed stream (a2) are contacted and mixed in a mixing apparatus without mechanical agitation before they are fed into the reactor.

17. The method of claim 16, wherein the feed stream (a1) has a flowrate of $F_1$, the feed stream (a2) has a flowrate of $F_2$, the flowrates of $F_1$ and $F_2$ between $t_1$ and $t_2$ are defined as: $F_1=f(t)$; $F_1\geq0$; $F_2=f(t)$; $F_2\geq0$; and $F_1\neq F_2$.

18. The method of claim 1, wherein after the co-precipitation reaction, the slurry of the precipitated precursor particles is drained out from the reactor by an outflow (c), the precursor particles drained out are filtered and dried to get dried precursor particles, the dried precursor particles are mixed with a lithium resource and then calcined to form concentration gradient cathode particles.

19. The method of claim 1, wherein the method further comprises feeding a feed stream (d) containing chelating agents into the reactor, the feed stream (d) is selected from ammonia hydroxide, ammonium chloride, ammonium sulfate, ammonium dihydrogen phosphate, ethylene glycol, carboxylic acids, ammonium nitrate, glycerol, 1,3 propanediol, urea, N,N'-dimethylurea, quaternary ammonia salts, or any combination thereof.

* * * * *